United States Patent Office 2,760,982
Patented Aug. 28, 1956

2,760,982

SUBSTITUTED PHENANTHREN-2-ONES

William S. Knowles, Kirkwood, Mo., assignor to Monsanto Chemical Company, St. Louis, Mo., a corporation of Delaware No Drawing. Application February 9, 1953,
Serial No. 335,990

8 Claims. (Cl. 260—586)

This invention relates to new and useful substituted phenanthren-2-ones. More particularly it relates to 8a-methyl, $\Delta^{6,10a(1)}$-decahydrophenanthren-2-ones and to the method for their preparation.

The new compounds of this invention namely, 8a-methyl-$\Delta^{6,10a(1)}$-decahydrophenanthren-2-one and 1,8a-dimethyl-$\Delta^{6,10a(1)}$-decahydrophenanthren-2-one, may be represented by the structural formula

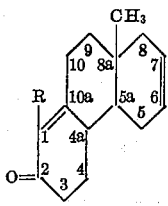

where R is hydrogen or a methyl radical.

The new compounds are prepared by reacting an 8a-methyl, $\Delta^{6,9,10a(1)}$-octahydrophenanthren-2-one of the structural formula

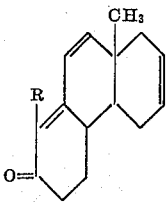

where R has the same significance as above with one molar equivalent of hydrogen in the presence of palladium.

It will be obvious to those skilled in the art that the novel compounds of this invention contain three asymmetric carbon atoms. As a result thereof, these compounds may exist in eight optically active forms or four racemeates, i. e., anti-trans, syn-trans, anti-cis, and syn-cis racemic mixtures of dextro and levo optically active isomers. All such forms of the new substituted phenanthren-2-ones are contemplated as coming within the scope of this invention. The notations "cis" and "trans" as used in the specification indicate the spacial configuration of the CH$_3$ group and H at positions 8a and 5a respectively in the structural formula. The notations "syn" and "anti" as used in the specification indicates the spacial configuration of H at position 4a with respect to the 5a H substituent in the structural formula. It is to be understood that where no notation appears with the name of the new compounds, that the same is to be interpreted in its generic sense, that is as representing the individual dextro and levo isomers in separated form as well as the racemic mixtures thereof or isomeric racemic mixtures of same or the total unresolved mixture of isomers.

The new compounds of this invention are useful as plasticizers for polyvinylchloride.

The trans isomers of the new substituted phenanthren-2-ones of this invention are useful in the preparation of steroidal hormones. The anti-trans isomers are particularly useful in the preparation of steroids similar to those found in the adrenal cortex.

As illustrative of the novel process and products of this invention is the following:

Example I

Approximately 50 parts by weight (substantially 0.087 mols) of unresolved 1,8a-dimethyl-$\Delta^{6,9,10a(1)}$-octahydrophenanthren-2-one is admixed in a suitable reaction vessel with 200 parts by weight of isobutanol and approximately 2.5 parts by weight of a 10% palladium charcoal catalyst (prepared by reducing palladium chloride in an alkaline suspension of activated carbon). While agitating, gaseous hydrogen is passed into the mixture at 25–30° C. and at substantially atmospheric pressure. After absorption of substantially one molar equivalent of hydrogen, the catalyst is removed by filtration. The catalyst is washed with hot isobutanol and the washings and original filtrate combined, which combination is then subjected to vacuum distillation. Upon removal of the isobutanol there is obtained a good yield of a product believed to be 1,8a-dimethyl-$\Delta^{6,10a(1)}$-decahydrophenanthren-2-one.

Example II

Approximately 10 parts by weight of $dl$-anti-trans-1,8a-dimethyl-$\Delta^{6,9,10a(1)}$-octahydrophenanthren-2-one (M. P. 72–73° C.) is admixed in a suitable reaction vessel with approximately 44 parts by weight of benzene and one part by weight of a 2% palladium-strontium carbonate catalyst (which had been previously reduced). While agitating, gaseous hydrogen is passed into the mixture at about 25° C. and at a pressure slightly above atmospheric. After absorption of substantially one molar equivalent of hydrogen, which takes about 1.2 hours, the catalyst is filtered off and the filtrate is subjected to vacuum distillation to remove the solvent. A yield of about 85% by weight of a substantially colorless oily product identified as $dl$-anti-trans-1,8a-dimethyl-$\Delta^{6,10a(1)}$-decahydrophenanthren-2-one is obtained.

Example III

Approximately 10 parts by weight of $dl$-anti-trans-8a-methyl-$\Delta^{6,9,10a(1)}$-octahydrophenanthren-2-one (M. P. 76–80° C.) is admixed in a suitable reaction vessel with approximately 44 parts by weight of toluene and one part by weight of a 2% palladium-calcium carbonate catalyst (which had been previously reduced). While agitating, hydrogen is passed into the mixture at about 25° C. and at substantially atmospheric pressure. After absorption of substantially one molar equivalent of hydrogen, the catalyst is removed by filtration and the filtrate is subjected to vacuum distillation to remove the solvent. A good yield of white solid $dl$-anti-trans-8a-methyl-$\Delta^{6,10a(1)}$-decahydrophenanthren-2-one (M. P. 91–93° C.) is obtained.

Example IV

Approximately 22.8 parts by weight of $d$-anti-trans-1,8a-dimethyl-$\Delta^{6,9,10a(1)}$-octahydrophenanthren-2-one (M. P. 42–44° C.) is admixed in a suitable reaction vessel with approximately 80 parts by weight of isopropanol and approximately 2.85 parts by weight of a 2% palladium-strontium carbonate catalyst (which had been previously reduced). While agitating, gaseous hydrogen is passed into the mixture at about 25° C. and at a pressure slightly above atmospheric, until approximately one molar equivalent of hydrogen is absorbed, which takes about 1.2 hours. The catalyst is filtered off, and the filtrate is subjected to vacuum distillation. The substantially colorless oil so obtained is identified as $d$-anti-trans-1,8a-dimethyl-$\Delta^{6,10a(1)}$-decahydrophenanthren-2-one, the yield being about 82% by weight.

*Example V*

Approximately 22.8 parts by weight of *l*-anti-trans-1,8a-dimethyl-$\Delta^{6,9,10a(1)}$-octahydrophenanthren-2-one (M. P. 42–44° C.) is admixed in a suitable reaction vessel with approximately 80 parts by weight of isopropanol and approximately 2.85 parts by weight of a 2% palladium-strontium carbonate catalyst (which had been previously reduced). While agitating, gaseous hydrogen is passed into the mixture at about 25° C. and at substantially atmospheric pressure until approximately one molar equivalent of hydrogen is absorbed, which takes about 1.2 hours. The catalyst is filtered off and the filtrate is subjected to vacuum distillation. The substantially colorless oil so obtained is identified as *l*-anti-trans-1,8a-dimethyl-$\Delta^{6,10a(a)}$-decahydrophenanthren-2-one, the yield being approximately 83% by weight.

As aforenoted the hydrogenation catalyst of this invention is palladium and such is employed in any amount sufficient to catalyze the reaction. In the process of this invention while metallic palladium is operable it is preferred that palladium be distributed on a suitable carrier such as activated carbon, alumina, diatomaceous earth, silica, barium sulfate, strontium carbonate, calcium carbonate, magnesium carbonate, and the like, and suspended in the reaction medium. The hydrogenation is best conducted in a liquid medium, as for example in the presence of an inert organic solvent incapable of being hydrogenated. Examples of such are benzene, toluene, xylene, ethyl benzene, cyclohexane, the liquid alkanes, lower aliphatic alcohols, acetone, butanone, etc.

The hydrogenation reaction is usually carried out at atmospheric pressure, however, super- or sub-atmospheric pressures may be employed. Although temperatures in the range of 0° C. to 50° C. are particularly convenient, higher or lower temperatures may be employed. The extent of the hydrogenation may be readily followed by observing the decrease in pressure in the system as the hydrogen is absorbed. The hydrogenation is ordinarily and preferably continued until hydrogen has been absorbed in an amount corresponding to that theoretically required to convert the $\Delta^{6,9,10a(1)}$-octahydrophenanthren-2-one to the $\Delta^{6,10a(1)}$-decahydrophenanthren-2-one.

While the invention has been described with respect to certain specific embodiments it is not so limited and it is to be understood that variations and modifications thereof obvious to those skilled in the art may be made without departing from the spirit or scope of this invention.

What is claimed is:

1. As a new composition of matter a $\Delta^{6,10a(1)}$-decahydrophenanthren-2-one of the structural formula

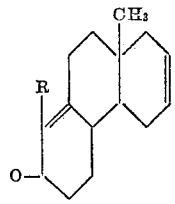

where R is a member of the group consisting of hydrogen and a methyl radical.

2. As a new compound a trans isomer of the compound of claim 1.

3. As a new compound *dl*-anti-trans-1,8a-dimethyl-$\Delta^{6,10a(1)}$-decahydrophenanthren-2-one.

4. As a new compound *d*-anti-trans-1,8a-dimethyl-$\Delta^{6,10a(1)}$-decahydrophenanthren-2-one.

5. As a new compound *l*-anti-trans-1,8a-dimethyl-$\Delta^{6,10a(1)}$-decahydrophenanthren-2-one.

6. The process of making the compound of claim 1 which comprises reacting a $\Delta^{6,9,10a(1)}$-octahydrophenanthren-2-one of the structural formula

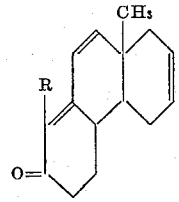

where R is a member of the group consisting of hydrogen and a methyl radical, with one molar equivalent of hydrogen in the presence of palladium.

7. The process of making the compound of claim 1 which comprises reacting in the presence of an inert organic solvent incapable of hydrogenation a $\Delta^{6,9,10a(1)}$-octahydrophenanthren-2-one of the structural formula

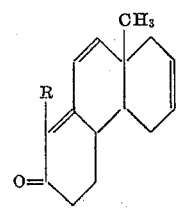

where R is a member of the group consisting of hydrogen and a methyl radical, with one molar equivalent of hydrogen in the presence of palladium.

8. The process of making the compound of claim 1 which comprises reacting a $\Delta^{6,9,10a(1)}$-octahydrophenanthren-2-one of the structural formula

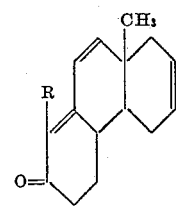

where R is a member of the group consisting of hydrogen and a methyl radical, with one molar equivalent of hydrogen in the presence of palladium dispersed in strontium carbonate.

References Cited in the file of this patent

Fieser et al.: Organic Chemistry, Heath & Co., 1944, pp. 785–786.

Woodward et al.: "Jour. Am. Chem. Soc.," vol. 74 (1952), pp. 4225–4228.